United States Patent [19]

Swars et al.

[11] Patent Number: 5,342,783

[45] Date of Patent: Aug. 30, 1994

[54] METHOD FOR DETECTING A REACTION ZONE IN A CATALYTIC CONVERTER

[75] Inventors: Helmut Swars, Bergisch Gladbach; Rolf Brück, Overath; Wolfgang Maus, Bergisch Gladbach, all of Fed. Rep. of Germany

[73] Assignee: Emitec Gesellschaft fuer Emissionstechnologie mbH, Lohmar, Fed. Rep. of Germany

[21] Appl. No.: 73,105

[22] Filed: Jun. 7, 1993

[30] Foreign Application Priority Data

Dec. 5, 1990 [DE] Fed. Rep. of Germany ....... 4038829

[51] Int. Cl.⁵ .............................. G01N 31/10
[52] U.S. Cl. ....................... 436/37; 436/34; 436/147; 422/177
[58] Field of Search ............ 422/171, 211, 177; 436/37, 147, 34

[56] References Cited

U.S. PATENT DOCUMENTS

| | | |
|---|---|---|
| 4,242,907 | 1/1981 | Kazmierowicz ............... 73/341 |
| 4,440,509 | 4/1984 | Agarwal ...................... 374/166 |
| 4,653,935 | 3/1987 | Daily et al. .................. 374/208 |
| 4,750,357 | 6/1988 | Anderson et al. ............ 73/195 |
| 4,805,188 | 2/1989 | Parker ........................ 374/141 |
| 5,064,506 | 11/1991 | Sparenberg et al. ........... 203/2 |
| 5,192,132 | 3/1993 | Pelensky ..................... 436/147 |

FOREIGN PATENT DOCUMENTS

| | | |
|---|---|---|
| 0236659 | 9/1987 | European Pat. Off. . |
| 0245737 | 8/1989 | European Pat. Off. . |
| 0245738 | 8/1989 | European Pat. Off. . |
| 0223058 | 10/1989 | European Pat. Off. . |
| 2643739 | 3/1978 | Fed. Rep. of Germany . |
| 3407911 | 9/1985 | Fed. Rep. of Germany . |
| 3710268 | 10/1988 | Fed. Rep. of Germany . |
| 55-110941 | 8/1980 | Japan . |
| 61-181921 | 8/1986 | Japan . |
| 49205 | 5/1992 | Japan ..................... 436/37 |

OTHER PUBLICATIONS

"Thermographische Untersuchungsmethoden in Technik und Ökologie", GIT Fachz. Lab. 22. Jg., May 1978, pp. 392–396.

Primary Examiner—Robert J. Warden
Assistant Examiner—Hien Tran
Attorney, Agent, or Firm—Herbert L. Lerner; Laurence A. Greenberg

[57] ABSTRACT

A catalytic converter has an inner region and a jacket surface surrounding the inner region and being disposed approximately parallel to a given flow direction. The inner region conducts a flow of a fluid containing ingredients to be converted in the inner region by a catalyzed exothermic reaction. The flow passes through the inner region in the given flow direction. The reaction zone is defined as a part of the inner region in which a reaction predominantly takes place. A method for detecting a reaction zone in the catalytic converter includes detecting the reaction zone by measuring a distribution of temperature over the jacket surface along a measurement path being aligned approximately parallel to the given flow direction. The reaction zone is determined by a segment of the measurement path at which the temperature deviates by less than a predetermined limit value from a maximum value of the temperature over the measurement path.

12 Claims, 2 Drawing Sheets

METHOD FOR DETECTING A REACTION ZONE IN A CATALYTIC CONVERTER

CROSS-REFERENCE TO RELATED APPLICATION

This application is a continuation of International application Ser. No. PCT/EP91/02206, filed Nov. 22, 1991.

SPECIFICATION

The invention relates to a method for detecting a reaction zone in a catalytic converter through which a fluid can flow that contains ingredients which can be converted by means of a catalytic, exothermic reaction.

The term "catalytic converter" is understood herein to mean a honeycomb-like body of metal or ceramic that has an inner region with a multiplicity of channels through which exhaust gases or other fluids with convertible ingredients can flow. Each channel has a wall that is covered with a coating of catalytically active material which is the catalyst per se. Such catalytic converters have manifold uses, particularly in the exhaust systems of internal combustion engines in motor vehicles, for converting the pollutants contained in the exhaust gases into harmless compounds. Metal catalytic converters are generally laminated, spirally wound or intertwined in some other way from structured metal sheets. Possibilities therefor are described in European Patent No. 0 223 058 B1, corresponding to U.S. Pat. No. 4,824,011; European Patent No. 0 245 737 B1, corresponding to U.S. Pat. Nos. 4,832,998 and 4,923,109; and European Patent No. EP 0 245 738 B1, corresponding to U.S. Pat. Nos. 4,803,189 and 4,946,822.

It is also already known, for monitoring the function of a catalytic converter in an engine exhaust system, to provide temperature sensors on or in the catalytic converter, that provide measurement values from which conclusions can be drawn as to the function during engine operation. Suggestions therefor can be found in German Published, Non-Prosecuted Applications DE 26 43 739 A1 and DE 37 10 268 A1, and in Published European Application No. 0 236 659 A1. In the first two of those references, a catalytic converter is said to be equipped with at least two spaced-apart temperature sensors. Either both may be located outside the catalytic converter, that is with a first sensor upstream of the upstream end of the catalytic converter and a second sensor downstream of the downstream end of the catalytic converter, or both may be disposed inside the catalytic converter. Additionally, a signal is formed from the measurement signals of two sensors that is equivalent to the difference between the temperatures detected by the sensors, and that signal is used to evaluate the function of the catalytic converter. A suitable evaluation system for that purpose is described in the third reference Published European Application No. 0 236 59 A1. That evaluation system occasions a warning signal if the temperature difference exceeds a certain first limit value, and a signal indicating permanent damage if the temperature difference exceeds a second limit value that is markedly above the first limit value.

Specific statements regarding the thermodynamic conditions prevailing in the interior of a catalytic converter cannot be made by using the proposals of the prior art. In particular, with the known systems, the status of a catalytic converter that overall is still functioning adequately cannot be judged. Yet doing so is necessary in order to arrive at findings with regard to the degree of wear of a catalytic converter, in view of the aging and/or poisoning processes that occur during operation.

It is accordingly an object of the invention to provide a method for detecting a reaction zone in a catalytic converter, which overcomes the hereinafore-mentioned disadvantages of the heretofore-known methods of this general type and which quickly and simply enables functional checking of a catalytic converter, particularly with a view toward aging and/or poisoning phenomena. The methods should be usable during regular operation of the catalytic converter or within brief interruptions in operation. In the special case of checking the function of catalytic converters in motor vehicle exhaust systems, the methods are intended to permit checking in the course of the regular motor vehicle inspections that are usual in the Federal Republic of Germany and in many states of the United States, for instance.

In accordance with the present invention, in order to check the function of a catalytic converter, it must be ascertained in what region in the interior of the catalytic converter the catalyzed reaction for converting the reactable ingredients of the fluid flowing through the catalytic converter primarily occurs.

With the foregoing and other objects in view there is provided, in accordance with the invention, in a method for detecting a reaction zone in a catalytic converter, including an inner region, a jacket surface surrounding the inner region and being disposed approximately parallel to a given flow direction; the inner region conducting a flow through the inner region in the given flow direction of a fluid containing ingredients to be converted in the inner region by a catalyzed exothermic reaction; and the reaction zone being defined as a part of the inner region in which a reaction predominantly takes place; the improvement which comprises detecting the reaction zone by measuring a distribution of temperature over the jacket surface along a measurement path being aligned approximately parallel to the given flow direction, and determining the reaction zone by a segment of the measurement path at which the temperature deviates by less than a predetermined limit value from a maximum value of the temperature over the measurement path.

The invention makes use of the fact that the catalytic activity of a catalytic converter, which is understood to include the maximally attainable conversion rate of the catalyzed reaction by the catalytic converter, is always measured with considerable excess for a given application. This is intended to compensate for a loss in activity from aging and/or poisoning that always occurs during operation and to attain a long useful service life during operation of the catalytic converter. Due to the high catalytic activity, the catalyzed reaction does not take place uniformly along the entire catalytic converter. It is limited to a relatively narrowly defined zone of the catalytic converter, which is referred to below as the "reaction zone", and in a new catalytic converter makes up hardly more than 20% of the total volume available. The form of the reaction zone is determined, among other factors, by the flow profile of the fluid flowing through the catalytic converter. Since the flow speed of the fluid is usually highest in the middle of the catalytic converter and decreases toward the peripheral regions, the reaction zone is not straight in the interior of the catalytic converter but rather it is approximately conical in shape. In the region of the jacket surface, the reaction zone is perceptible from the heat radiation originating in it. In the inner region of the catalytic converter, the temperature of the fluid does not drop substantially downstream of the reaction zone, but in the region of the jacket surface a significant drop in temperature downstream of the reaction zone, due to the heat radiation originating at the jacket surface, is observed.

Accordingly, the reaction zone can be detected by determining the region on the jacket surface in which the temperature deviates by less than a predetermined limit value from the maximum value of the temperature on the jacket surface. This is suitably carried out by defining a measurement path on the jacket surface that is advantageously aligned approximately parallel to the flow direction and carrying out the temperature measurement along this measurement path.

Since the temperature of the jacket surface in the area of the reaction zone is markedly elevated as compared with the temperature of the jacket surface remote from the reaction zone, the definition of the limit value to be specified for employing the invention is not critical as a rule. In series of tests of metal catalytic converters, it was found that the temperature of the jacket surface in the area of the reaction zone was elevated by a value of up to 80 K. By comparison, the limit value may amount to up to approximately 50 K, and preferably up to approximately 30 K. The invention in particular does not require any especially precise definition of the limit value. For instance, defining the limit value as the difference between the maximum temperature on the jacket surface of the catalytic converter to be monitored and a temperature at which a pigment reversibly or irreversibly changes its color is adequate as a rule. Detection of a reaction zone according to the invention in a catalytic converter using electric temperature sensors is also not substantially impaired if temperature sensors and evaluation devices associated with them that permit measurements only with relatively wide tolerances, for example in the range of 10%, are used.

In accordance with another mode of the invention, there is provided a method which comprises detecting the reaction zone during catalytic converter operation, while the fluid is flowing through the inner region. To that end, the jacket surface should, for instance, be provided with temperature sensors or the like. In such a case, in accordance with a further mode of the invention, it is advantageous to limit the method to operating states of the kind in which the fluid flows through the inner region of the catalytic converter in a steady flow. Especially in motor vehicle exhaust systems, unsteady flows arise particularly upon each load change and since they are always associated with changes in the chemical composition, temperature and flow speed of the exhaust gas, they can only be very poorly described in terms of their interaction with the catalytic converter. Since the catalytic converter in particular can only follow a temperature change on time scales on the order of approximately 1 second because of its thermal capacity, under some circumstances unsteady operating states may only produce limitedly interpretable measurement findings.

In accordance with an added mode of the invention, there is provided a method which comprises determining the reaction zone immediately after the fluid has flowed through the inner region. This is made possible by the simplicity of the invention. This is especially important, for example, for testing motor vehicle catalytic converters in the course of the regular inspection that is usual in some countries. Checking the catalytic converter can be performed immediately after the vehicle has only been briefly out of operation.

In accordance with an added mode of the invention, the temperature measurement necessary for detecting the reaction zone is carried out by evaluating the heat radiation originating at the jacket surface. The advantage of this step is that the measuring instrument necessary for the measurement need not be firmly joined to the catalytic converter, which can have advantages particularly with mobile catalytic converters.

In accordance with an additional mode of the invention, the measurement is carried out especially simply by making an infrared photograph of a segment of the catalytic converter jacket surface that contains the measurement path. Instant-type films can be used for this purpose, so that a temperature profile of the measurement path is available within the shortest possible time. A particularly clear view is then obtained if the reproduction is in color, with different colors indicating different temperatures. The film-based photograph may naturally be replaced by a video picture or the like. Direct machine evaluation of the temperature measurement is also possible in combination with known electronic picture processing devices.

In accordance with yet another mode of the invention, a simply way of carrying out the temperature measurement is provided by covering the measurement path with a substrate that has a color which changes in response to heat. Such a substrate may, for instance, be a coated paper strip, or a coating on the jacket surface itself. As in the case of the infrared photograph, the reaction zone is ascertained by evaluating the color of the substrate.

In accordance with yet a further mode of the invention, the temperature measurement is carried out with at least one temperature sensor being located on and movable over the measurement path. In accordance with yet an added mode of the invention, the measurement path is equipped with a plurality of temperature sensors. Although this embodiment of the invention is more expensive in terms of apparatus, nevertheless it enables permanent operational monitoring of the catalytic converter.

In accordance with yet an added mode of the invention, the detection of the reaction zone can be simplified in such a way that the temperature distribution measured in a specific case is compared with a multiplicity of predetermined standard distributions that have been detected in the context of calibration measurements for the particular catalytic converter type, for each of which the location of the reaction zone is known. Standard distributions can also be obtained by simulation computations. The location of the reaction zone can be detected by interpolation from standard distributions. In order to attain a given accuracy, an adequate number of different standard distributions is necessary.

In accordance with a concomitant mode of the invention, any embodiment of the invention is used for determining the degree of wear of a catalytic converter, where the location of the reaction zone with respect to the measurement path is used as a measure of the degree of wear. If the catalytic converter is new, then the catalyzed reaction primarily takes place in the immediate vicinity of the upstream end, where the fluid enters the catalytic converter. As aging increases, the reaction zone shifts from the upstream end to the downstream end where the fluid leaves the catalytic converter again. Particularly simple functional monitoring can be achieved in this way.

A particularly apt field for application of the invention, as already discussed in detail, is functional monitoring of catalytic converters in motor vehicle exhaust systems. In the course of typical tests for qualifying catalytic converter models, particularly the tests simulating typical vehicle operation that are required by law in the United States of America, temperatures between approximately 300° C. and 400° C. become established on the catalytic converter jacket surfaces. The location of the reaction zone in the inner region of the catalytic converter is clearly expressed by a maximum temperature on the jacket surface. The temperature of the jacket surface in the area of the reaction zone is typically elevated by approximately 60 K to approximately 80 K over the temperature of the jacket surface remote from the reaction zone. Such a pronounced maximum point can easily be detected and, because its location shifts as described with increasing wear of the catalytic converter, it offers a simple and reliable means for functional checking and/or functional monitoring of a catalytic converter in the exhaust system of a motor vehicle.

Other features which are considered as characteristic for the invention are set forth in the appended claims.

Although the invention is illustrated and described herein as embodied in a method for detecting a reaction zone in a catalytic converter, it is nevertheless not intended to be limited to the details shown, Since various modifications and structural changes may be made therein without departing from the spirit of the invention and within the scope and range of equivalents of the claims.

BRIEF DESCRIPTION OF THE DRAWINGS

The construction and method of operation of the invention, however, together with additional objects and advantages thereof will be best understood from the following description of specific embodiments when read in connection with the accompanying drawings.

Referring now to the figures of the drawing in detail and first, particularly, to FIG. 1 thereof, there is seen a catalytic converter 2, through which a fluid, particularly the exhaust gas of an internal combustion engine that contains catalytically convertible components, flows in a flow direction 4. The fluid enters the catalytic converter 2 at an upstream end 12 and leaves the catalytic converter 2 at a downstream end 13. In the present case, the catalytic converter 2 is cylindrical, but other shapes which are described, for instance, in the description of the related prior art, are also conceivable. Between the upstream end 12 and the downstream end 13, the catalytic converter 2 is defined by a jacket surface 5, which in the present case is a cylindrical jacket on which a measurement path 6 is marked for determining a distribution of temperature over the jacket surface 5 in accordance with the invention. By way of example, the temperature distribution can be measured with temperature sensors 10, 11. These include movable temperature sensors 10 and stationary temperature sensors 11 which are equally usable. In the case of temperature measurement, heat radiation 7 originating in a section 8 of the jacket surface 5 that contains the measurement path 6, may also be analyzed. This may be done, for instance, by making an infrared photograph of the section 8 by a device 14. An equivalent means in terms of effect is to apply a substrate 9 having a color that varies reversibly or irreversibly under the influence of heat, to the section 8. From the color change that occurs, the location of the reaction zone 1 can be detected on the substrate 9. By way of example, FIG. 1 shows three substrates 9, with transverse lines that are intended to indicated color boundaries. A location of a reaction zone 1 is indicated in each case.

FIG. 2 shows the location of the reaction zone 1 in an inner region 3 of a catalytic converter 2. Due to the fluid that flows in the flow direction 4 from the upstream end 12 to the downstream end 13, the reaction zone 1 is not flat but rather is curved. The curvature is determined substantially by the distribution of the flow speed of the fluid, which is always less at the edge of the inner region 3 than in the area of its middle.

In FIG. 3, the temperature distribution over the measurement path 6 from the upstream end 12 to the downstream end 13 is plotted. A distance w extending over the measurement path 6 is plotted on the abscissa of the diagram, and a temperature T is plotted on the ordinate. In the region of the upstream end 12, the temperature on the measurement path 6 is substantially equivalent to the temperature of the in-flowing fluid. Downstream of the upstream end 12, the temperature on the measuring path 6 rises as a result of the ensuing catalytic reaction, until it reaches a maximum, and then drops again toward the downstream end 13. A maximum in temperature indicates the location of the reaction zone 1 in the inner region of the catalytic converter, since the heat production is at a maximum in the reaction zone 1. Downstream of the reaction zone 1, virtually no further heat production takes place, and as a result of the radiation of heat from the jacket surface, the temperature to be measured on the measurement path drops again. The location of the maximum point in the temperature distribution over the measurement path 6 can be used as an indicator for the location of the reaction zone 1 in the interior of the catalytic converter. If the catalytic converter is relatively new, then the maximum point of the temperature distribution is in the vicinity of the upstream end 12, as is indicated by the curve shown in solid lines in FIG. 3. With increasing aging and/or poisoning of the catalytic converter, the location of the maximum point migrates from the upstream end 12 to the downstream end 13, as is seen by the curve shown in dot-dashed lines in FIG. 3. This occurs since the catalytic converter has largely lost its activity in the vicinity of the upstream end 12.

Figure 1:
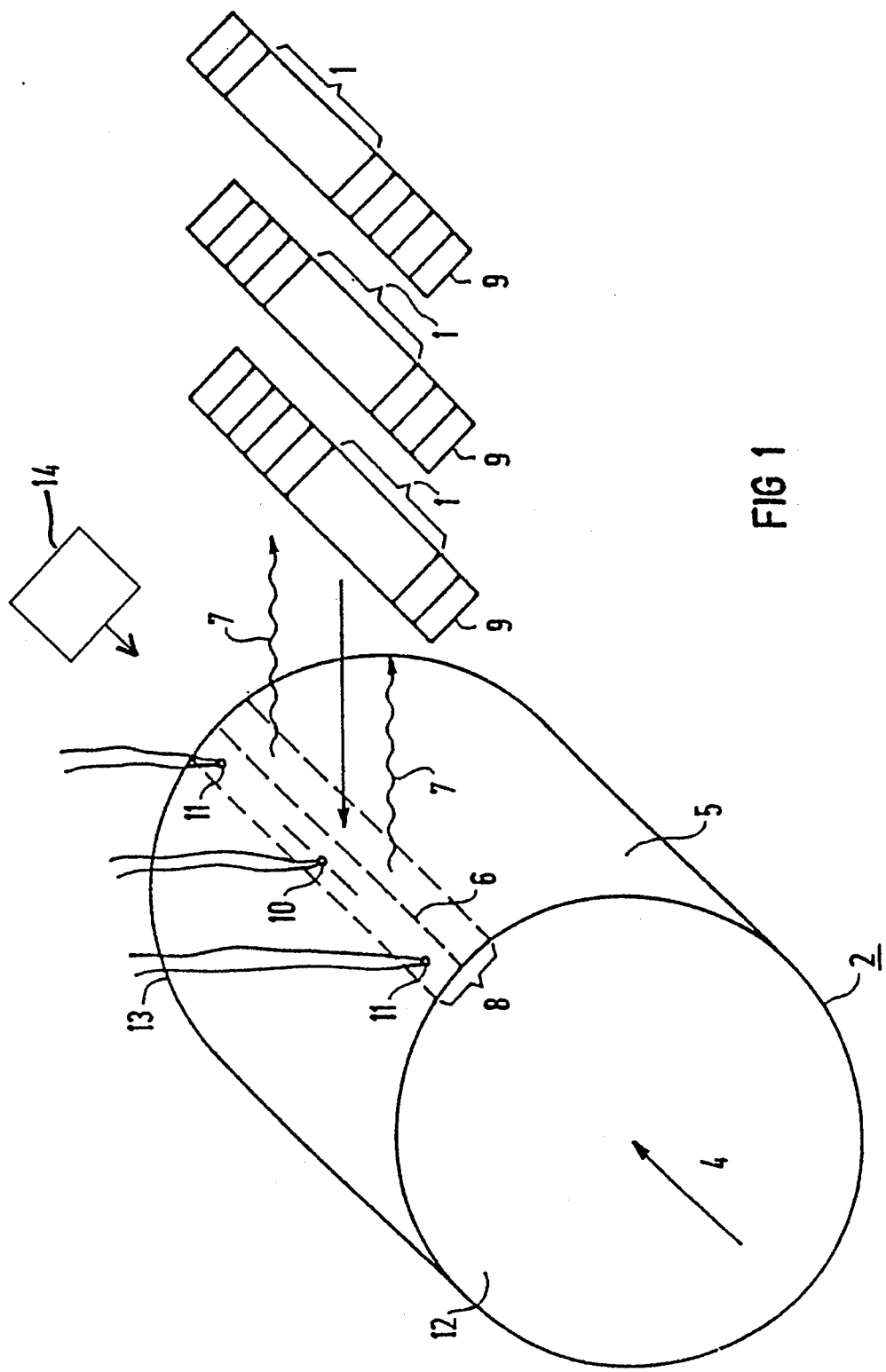
FIG. 1 is a diagrammatic perspective view of a catalytic converter equipped for detecting a reaction zone in accordance with the invention.
Figure 2:
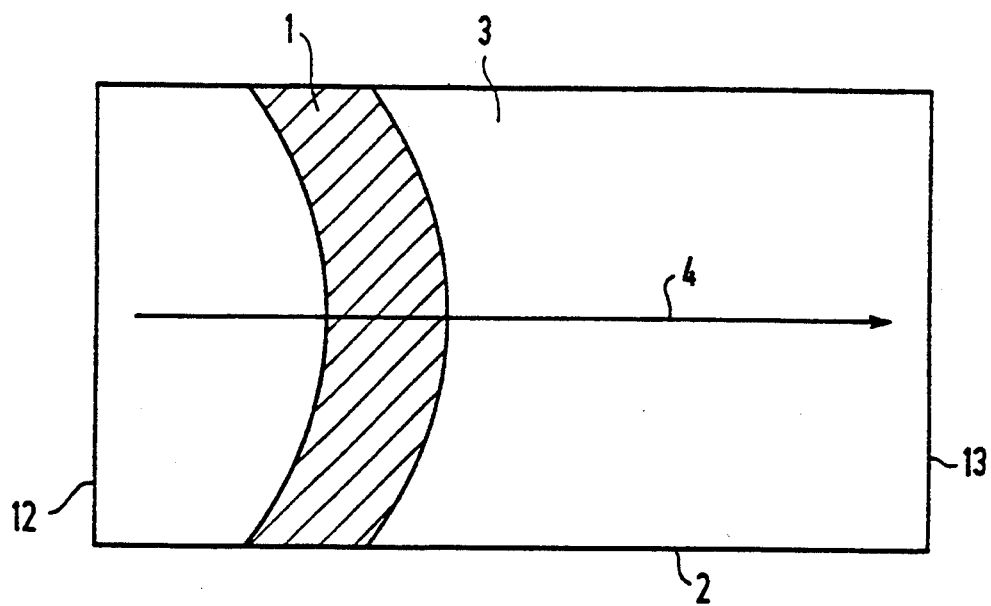
FIG. 2 is a cross-sectional view of a catalytic converter.
Figure 3:
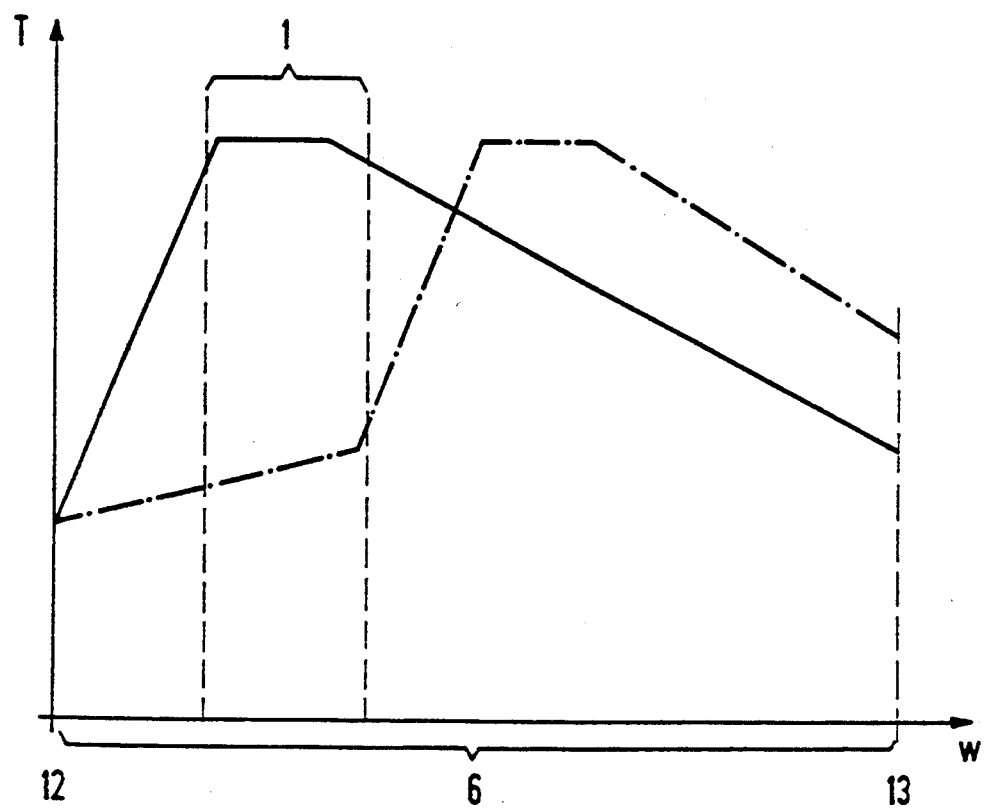
FIG. 3 is a graph of a temperature distribution over a jacket surface of a catalytic converter.

The invention offers a simple, fast and reliable way of obtaining a statement as to the functional capability of a catalytic converter.

We claim:

1. In a method for detecting a reaction zone in a catalytic converter, including providing a catalytic converter comprising:

a) an inner region, a jacket surface surrounding the inner region and being disposed approximately parallel to a given flow direction;

b) the inner region conducting a flow through the inner region in the given flow direction of a fluid containing ingredients to be converted in the inner region by a catalyzed exothermic reaction; and c) a reaction zone being defined as a part of the inner region in which the catalyzed exothermic reaction predominantly takes place;

the improvement which comprises:

The method according to claim 5, wherein the evaluating step comprises;

defining a limit value of a temperature deviation; and determining the reaction zone by locating a segment of the measurement path at which the temperature deviates by less than the limit value from a maximum value of the temperature along the measurement path.

2. The method according to claim 1, wherein the measuring step is performed while the fluid is flowing through the inner region.

3. The method according to claim 2, wherein the fluid is conducted through the inner region in a steady flow.

4. The method according to claim 1, wherein the determining step is performed after a flow of the fluid has passed through the inner region.

5. The method according to claim 1, wherein the measuring step comprises evaluating heat radiation originating at the jacket surface.

6. The method according to claim 5, wherein the evaluating step comprises imaging the heat radiation originating at the jacket surface by means of at least one of an electronic image processing device and a photographic device such that the temperature distribution along the measurement path is displayed on an image obtained in the imaging step.

7. The method according to claim 1, which comprises:

a) covering the measurement path with a substrate having a color changing under the influence of heat; and b) detecting the reaction zone by evaluating the color of the substrate.

8. The method according to claim 1, wherein the temperature distribution is measured with at least one temperature sensor being located on and movable along the measurement path.

9. The method according to claim 1, wherein the temperature distribution is measured with a plurality of temperature sensors being disposed along the measurement path.

10. In a method for detecting a reaction zone in a catalytic converter, including:

a) an inner region, a jacket surface surrounding the inner region and being disposed approximately parallel to a given flow direction;

b) the inner region conducting a flow through the inner region in the given flow direction of a fluid containing ingredients to be converted in the inner region by a catalyzed exothermic reaction; and c) the reaction zone being defined as a part of the inner region in which a reaction predominantly takes place;

the improvement which comprises: measuring a distribution of temperature over the jacket surface along a measurement path aligned approximately parallel to the given flow direction;

comparing the measured distribution of the temperature with a multiplicity of predetermined standard distributions, for each of which the reaction zone is known; and determining the reaction zone by interpolation for the measured distribution of the temperature.

11. The method according to claim 1, which comprises determining the degree of wear of a catalytic converter by using the location of the reaction zone with respect to the measurement path as a measure of the degree of wear.

12. In a method for detecting a reaction zone in a catalytic converter, including:

a) an inner region, a jacket surface surrounding the inner region and being disposed approximately parallel to a given flow direction;

b) the inner region conducting a flow through the inner region in the given flow direction of a fluid containing ingredients to be converted in the inner region by a catalyzed exothermic reaction; and c) the reaction zone being defined as a part of the inner region in which a reaction predominantly takes place;

the improvement which comprises:

measuring a distribution of temperature over the jacket surface along a measurement path aligned approximately parallel to the given flow direction;

locating a maximum temperature along the measurement path and defining a maximum temperature location;

determining an interval along the measurement path around the maximum temperature location within which the temperature deviates by less than a predetermined limit value from the maximum value at the maximum temperature location, and defining a boundary of the reaction zone.

* * * * *

UNITED STATES PATENT AND TRADEMARK OFFICE
CERTIFICATE OF CORRECTION

PATENT NO. : 5,342,783
DATED : August 30, 1994
INVENTOR(S) : Helmut Swars et al.

It is certified that error appears in the above-indentified patent and that said Letters Patent is hereby corrected as shown below:

Column 7, lines 9 and 10, change

"The method according to claim 5, wherein the evaluating step comprises:" to

-- measuring a distribution of temperature over the jacket surface along a measurement path being aligned approximately parallel to the given flow direction; --.

Column 7, line 53, after "including", insert

-- providing a catalytic converter comprising --.

Column 8, line 12, change "a" to --- the catalyzed exothermic --;

UNITED STATES PATENT AND TRADEMARK OFFICE
CERTIFICATE OF CORRECTION

PATENT NO. : 5,342,783
DATED : August 30, 1994
INVENTOR(S) : Helmut Swars et al.

It is certified that error appears in the above-indentified patent and that said Letters Patent is hereby corrected as shown below:

```
line 17, after "distributions", insert
    -- of temperature --;
line 22, change "the" to -- a --
         change "a" to -- the --;
lines 24 and 25, delete "as a measure of the
    degree of wear."
line 27, after "including", insert
    -- providing a catalytic converter comprising --;
line 35, change the first occurrence of "the" to
    -- a --;
line 36, change "a" to -- the catalyzed exothermic --
```

Signed and Sealed this

Twenty-third Day of January, 1996

Attest:

BRUCE LEHMAN

*Attesting Officer*     *Commissioner of Patents and Trademarks*